United States Patent Office 2,999,020
Patented Sept. 5, 1961

2,999,020
PROCESSES FOR THE TENDERING OF MEAT
Beverly E. Williams, La Grange Park, Ill., assignor to Hodges Research and Development Company, New York, N.Y., a corporation of California
No Drawing. Filed June 9, 1959, Ser. No. 819,003
5 Claims. (Cl. 99—107)

This invention relates to processes for the treatment of meat and more particularly to processes for improving the tenderness of freshly slaughtered, edible animal carcasses which have been subjected to preservative treatment by use of antibiotics.

This application is a continuation-in-part of my copending application Serial No. 729,531, now abandoned.

Antibiotics have recently been introduced to preserve meats and these antibiotics have been injected into the cattle both ante-mortem and post-mortem and carcasses have also been dipped post-mortem in antibiotic solutions to preserve the meat. Various of the antibiotics are suitable for this purpose, such as oxytetracyclin, chlortetracycline, tetracycline, chloromycetin, streptomycin, penicillin and the like, with the broad spectrum antibiotics being preferred. The broad spectrum antibiotics are effective against many gram-positive and gram-negative bacteria and certain of them, such as oxytetracycline, are fairly stable at low and room temperatures but decompose at the temperatures used in cooking.

The antibiotics may be used in any of their known antibacterially active forms, such as the base or acid per se or salts, and when penicillin is used, it is preferably employed as one of its metal or organic base salts. Generally, the amount of antibiotic required in relation to the weight of the animal treated is very small. When the antibiotic is to be administered ante-mortem by intraperitoneal injection or by injection at the base of the ear, or at the base of the tail, from 1 to 10 mg. per live weight pound is sufficient, while normally 2–5 mg. per pound is preferred. As low as .8 gram has proven effective on injection into live animals one to four hours prior to slaughter. Similar proportions are utilized in spraying, pumping, dipping, and other techniques.

The antibiotic destroys the internal, deep-seated anaerobic bacteria in the meat and the meat is preserved and keeps much longer at any temperature than untreated meat. I have found, however, that meat from cattle injected with an antibiotic, or meat treated promptly after the animal is slaughtered, not only retains its freshness and does not spoil, but also, retains its toughness even though the antibiotic treated meat is hung in conventional coolers or meat aging rooms for the normal three to four weeks aging period. Antibiotic treated meat also retains its original blande taste, as well as toughness, and is not susceptible to regular aging procedures to improve the flavor and tenderness of the meat.

As noted above, the antibiotic in the meat destroys the bacteria therein, and the air-borne molds, uninhibited by bacteria in the meat, grow profusely on the exposed meat surface. Certain of these molds are thought by some to promote flavor in the meat—others do not—but in spite of the profuse growth of molds on the surface of the meat, no improvements in flavor or tenderness of the meat is noted.

Most unexpectedly, I have found that the animal proteolytic enzymes, such as pepsin, trypsin and chymotrypsin, in combination with vegetable proteolytic enzymes, or alone, when injected into meat immediately after slaughter and before rigor mortis, which meat has been previously treated by an antibiotic injection into the live cattle or by pumping or dipping the fresh meat into said antibiotic, have a synergistic effect in improving the tenderness of freshly slaughtered edible animal carcasses.

The animal enzymes may be introduced into the antibiotic treated carcass by stitch pumping in well known manner. The injection solution containing the animal enzymes may also include small quantities of common salt and other components, such as gelatin and casein, to increase absorption and to stimulate protein hydrolysis. Hyaluronidase has been found effective, when small amounts are added to the enzyme solution, to obtain speedier absorption, penetration, and distribution of the enzymes. The enzyme solution may also include small amounts of ascorbic acid to stimulate the Cathepsin, present in the meat. The ascorbic acid also stimulates the animal enzymes, trypsin, pepsin, and chymotrypsin.

Acidity of meat freshly killed, before rigor mortis, is around pH 7, falling to an average of around pH 5 in rigor. The course of acid production in rigor mortis is not lineal with time. There is a latent period of variable duration, during which little acid is produced, then a comparatively rapid outburst of acid production to a level of about pH 6.6, and finally a further slow production to the ultimate value. The latent period may be anything from nil to seven or eight hours, varying inversely with the activity of the animal before slaughter. Since slaughterhouse animals are normally well rested, it can be assumed that the latent period will normally be in evidence. The production of acid can continue for more than 24 hours after death. The resolution of rigor covers a period of days and appears to vary with temperature.

I have found the proteolytic enzymes of pepsin, trypsin, and chymotrypsin are most active in the acid pH range of freshly slaughtered beef, becoming inactive as the pH of beef changes to neutral or alkaline, thus eliminating the need for an arrestor of their action, such as is required by vegetable proteolytic enzymes. Pepsin, which is active in the stomach in the more acid range (pH 2), is effective in the meat only during the rapid outbursts of lactic acid during rigor. Trypsin, which is active in the intestines at a less acid level of around pH 5, begins its activity during incipient rigor and resumes its activity again as rigor subsides and the beef or meat becomes less acid and the pH level approaches 6 or 7. Cathepsin is an intercellular enzyme naturally present in meat, and I have found it is stimulated by ascorbic acid. Thus the combination of the added animal enzymes have a tenderizing effect during the first twenty-four to forty-eight hours of rigor, and continue until the beef approaches neutral pH, or becomes slightly alkaline, at which points their effectiveness is diminished or terminated completely; thus, no arrestor for their activity is required. Nature, changing the pH of beef during ordinary cooler storage, diminishes and completely terminates the activity of these animal enzymes, which is quite contrary to vegetable enzymes, which are not critically affected by the acidity or alkalinity of the meat, and thus require a buffer, or terminator, such as an amino acid, a preservative, a preservative gas, or an antibiotic, or heat at about 168° F., or freezing at around 0° F.

I have found that the hydrolysis of muscle protein can be stimulated by an injection into the freshly slaughtered beef of gelatin and casein. When about 1% common salt, sodium chloride, or other edible hydroscopic salt is used in the injection solution, moisture is drawn out of the muscle fibre bundles and the meat seems, upon cooking, to be more juicy and more tender. The gelatin in the injection solution assists in the distribution of the fluid throughout the tissues of the freshly slaughtered edible animal carcass, as does hyaluronidase from bull testicles. The injection solution usually amounts to about 6 pints for a 600 pound dressed steer, which is approximately 1% of the hot weight of the dressed steer and ¼ ounce of dry powdered edible beef bone gelatin, 85–87% protein, should be used with this amount of injection solution.

The cattle may be inoculated with the antibiotic either ante- or post-mortem, and the freshly slaughtered carcass is then stitch pumped with the injection solution of animal enzymes while it is still warm and flaccid and before rigor mortis. In one procedure, in accordance with the present concept, the beef animal was injected with an antibiotic solution at about the fourth vertebrae of the tail, because the tail is removed from the dressed carcass after slaughter, and any spotting of the meat at the point of injection is thus eliminated. The antibiotic injection consisted of one gram of oxytetracycline as the hydrochloride in 50 ml. of sterile distilled water. The beef animal was slaughtered two hours after the antibiotic injection and after slaughter, the carcass was divided into sides weighing approximately 300 pounds each.

One side was then injected with three pints of enzyme solution by stitch pumping. The enzyme solution was made up of three pints of sterile water, 1 gram of a mixture of equal amounts of pepsin and trypsin, ¼ ounce of powdered bone gelatin, 1 ounce of casein, and about 1% common salt. The two sides were then placed in a cooler and chilled in the usual manner. At the end of 48 hours sample steaks were taken from the eye of the loin for test eating. The steaks from the side which was not injected with the enzyme solution were extremely tough and bland in flavor, while the steaks from the side treated with the enzyme solution were of improved tenderness and were more juicy.

Similar eating tests were conducted at the end of 5, 10, and 21 days and the beef side treated with the enzymes solution was found to have the greatest difference in tenderness over the control side.

In this example pepsin and trypsin were used in equal proportions in the injection solution, but the use of equal proportions is not mandatory. Trypsin is active at a different pH than pepsin, and the combination of trypsin and pepsin work synergistically to improve the tenderness of the freshly slaughtered edible animal carcass, each having its own sphere of greatest influence, with enough overlapping to enable them to work together to add more than each could do individually or separately to improve the tenderness of the meat before, through, and beyond rigor mortis. It is difficult, if not impossible to determine critical proportions of pepsin and trypsin or chymotrypsin in the injection solution, since the amount of these enzymes employed is quite small. It can be stated, however, that a range of from 1 to 3 parts pepsin to 3 to 1 parts of trypsin is within the scope of the present invention. These enzymes in the injection solution are equally important because of their synergistic action, with one working during certain phases of rigor and the other during other phases, and even after rigor to accomplish more tendering together than each would alone.

Another complementary, if not synergistic, effect of these animal enzymes is that whereas collagen in meat is resistant to trypsin and chymotrypsin, as well as papain, pepsin readily digests collagen, thus increasing the resultant tenderness of the meat.

In another example of the process of the present invention, a 1000 pound beef steer was treated with an antibiotic as described above and was then slaughtered and divided into halves. One side was then stitch pumped while still warm and flaccid and before rigor mortis with an enzyme solution weighing 1% of the weight of the side and having therein 1 gram of pepsin, 1 gram of trypsin, and, in minor amount, ¼ gram of papain, a vegetable enzyme. The second side was stitch pumped while still warm and flaccid and before rigor mortis with an enzyme solution containing 1 gram each of pepsin and trypsin, no papain, but including ¼ ounce of powdered bone gelatin, 1 ounce of casein, 1% of common salt, and a small amount of ascorbic acid. The total enzymes employed in the second side was .0167 of the enzyme solution.

These sides were then hung in a cooler for four days in the usual manner and steaks from them were then test eaten. The steaks from the side stitched with the enzyme solution including gelatin, casein, common salt and ascorbic acid were somewhat more tender than those from the side stitch pumped with the solution containing only pepsin, papain and trypsin, proving the advantages derived from using gelatin, casein, common salt, and ascorbic acid in the injection solution.

In another example, cattle injected with antibiotic (terramycin) in accordance with the process described above were slaughtered after 1½ hours, and one side (300 lbs.) was pumped, immediately after slaughter, with 3 pints (1%) of ⅓ gram of pepsin and ⅔ gram trypsin; the other side was pumped, immediately after slaughter, with ⅔ gram pepsin and ⅓ gram trypsin. The beef was allowed to hang in the cooler four days and the meat was then tested for tenderness. The second side was more tender.

Another beef, similarly treated with antibiotic injection before slaughter, was pumped with 2%, or approximately 6 pints of liquid, containing ½ gram pepsin and 1½ grams trypsin. The mate side was pumped, also immediately after slaughter, with 1½ grams pepsin and ½ gram trypsin. Tenderness, after four days of cooler hanging, favored the side with the increased amount of pepsin.

In the examples given above it will be noted that the injection medium contains approximately .02% of the animal enzymes.

A third steer, similarly live injected with antibiotic, was, immediately after slaughter, divided into sides, and one side was pumped with 2% by weight of fluid containing 1½ grams trypsin, ½ gram pepsin, plus, in minor amount, ¼ gram of ficin, a proteolytic enzyme derived from the latex of figs. The mate side was injected with ½ gram trypsin, 1½ grams pepsin, with no ficin. After four days of chilling in the cooler, the side containing the ficin was a trifle more tender than the mate side. Ficin is said to be seven times more potent than papain. However, in tests conducted with the processes of the present invention it appeared to be actually about four times more potent than papain, i.e., ¼ gram of ficin equals 1 gram of papain.

It should now be apparent to those skilled in the art that I have for the first time successfully utilized a novel process for tendering meat which has been treated either ante- or post-mortem with an antibiotic, by stitch pumping the carcass while still warm and flaccid and before rigor mortis with an injection solution containing especially the animal enzymes trypsin, chymotrypsin, and pepsin. Bromelin can be used in place of ficin and in the same amount.

Changes in or modifications to the above described illustrative procedures of the present invention may now be suggested without departing from the present inventive concept. Reference should therefore be had to the appended claims to determine the scope of this invention.

What is claimed is:

1. In a process for tendering meats treated with an antibiotic from 1 to 10 mg. per live weight pound for preserving the meat, the step of injecting the freshly slaughtered carcass while warm and flaccid before rigor mortis with an injection medium having approximately .02% mixture of the animal enzymes trypsin, pepsin present in the medium in proportions of 3 to 1 parts of trypsin to 1 to 3 parts of pepsin, and thereafter cooling and storing the meat.

2. A process according to claim 1, in which the mixture of enzymes trypsin, pepsin, includes approximately ¼ ounce of a vegetable enzyme selected from the group consisting of papain and ficin and is dispersed in a fluid solution weighing approximately 1% of the weight of the carcass being treated.

3. A process according to claim 2, in which the fluid solution contains approximately ¼ ounce powdered bone gelatin, approximately 1 ounce casein, and 1% common salt.

4. In a process for tendering meats treated with an antibiotic from 1 to 10 mg. per live weight pound for preserving the meat, the step of injecting the freshly slaughtered carcass while warm and flaccid before rigor mortis with a fluid injection solution weighing approximately 1% of the weight of the carcass being treated, containing the proteolytic enzymes trypsin and pepsin in the range of 3 to 1 parts of trypsin to 1 to 3 parts of pepsin and minor amounts approximating ¼ ounce of an enzyme selected from the group consisting of papain and ficin, to accomplish tenderness in the meat; thereafter chilling and storing the meat.

5. A process according to claim 4, in which the fluid solution contains approximately ¼ ounce of powdered bone gelatin, approximately 1 ounce of casein, and approximately 1% common salt.

References Cited in the file of this patent

UNITED STATES PATENTS

| | | |
|---|---|---|
| 2,043,392 | Paddock et al. | June 9, 1936 |
| 2,140,781 | Allen | Dec. 20, 1938 |
| 2,786,768 | Deatherage | Mar. 26, 1957 |
| 2,798,812 | Savich | July 9, 1957 |
| 2,903,362 | Beuk et al. | Sept. 8, 1959 |